Aug. 10, 1943.  E. EICHENBERGER  2,326,343
PENCIL TYPE FLASHLIGHT
Filed March 21, 1941
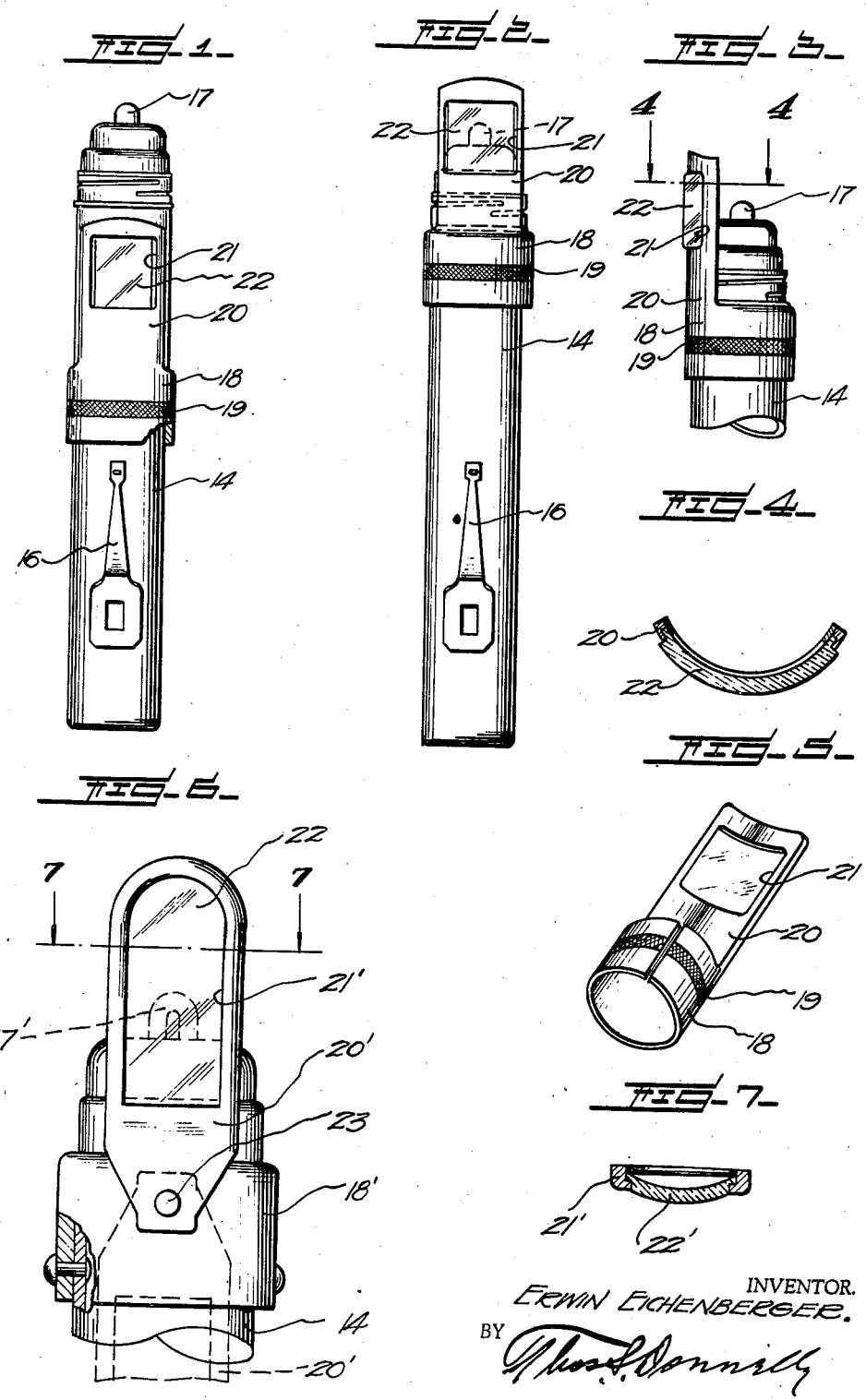
INVENTOR.
ERWIN EICHENBERGER.
BY Patented Aug. 10, 1943

2,326,343

UNITED STATES PATENT OFFICE 2,326,343

PENCIL TYPE FLASHLIGHT

Erwin Eichenberger, Detroit, Mich.

Application March 21, 1941, Serial No. 384,438

2 Claims. (Cl. 88—39)

My invention relates to a new and useful improvement in a flash light attachment adapted particularly for use on the pencil type flash lights which are of very small diameter and may be carried in the pocket similar to a pencil.

In the use of a flash light it is frequently necessary to magnify the object on which the light is directed. Particularly is this so in reading small print and especially in reading gas meters and electric meters and the like located in dark places. The device is also adapted for use in reading matters in small print and particularly adapted for use by military officers in reading maps and the like. The invention has also proven itself quite efficient in food inspection operations, permitting the food to be illuminated and, at the same time, magnified while being examined.

It is an object of the present invention to provide a flash light equipped with magnifying means so constructed and arranged and mounted on the flash light that it may be easily and quickly moved to position for use and moved to non-usable position, while, at the same time, the size of the flash light itself is substantially unaffected.

It is another object of the present invention to provide a device of this type, which will be simple in structure, economical of manufacture, durable, compact, easily and quickly mountable in position and removed therefrom and one which will be highly efficient in use. Other objects will appear hereinafter. It is recognized that various departures from the detail of structure illustrated may be made without departing from the invention, and it is intended that such modifications and variations may be embraced within the scope hereof.

Forming a part of this specification is a drawing in which:

Fig. 1 is a side elevational view showing a magnifying lens in an inoperative position.

Fig. 2 is a view similar to Fig. 1 showing the magnifying lens in operative position.

Fig. 3 is a fragmentary side elevational view of Fig. 2.

Fig. 4 is a sectional view taken on line 4—4 of Fig. 3.

Fig. 5 is a perspective view of the slidable attachment.

Fig. 6 is a fragmentary side elevational view of a slightly modified form of the invention with parts broken away and parts shown in section.

Fig. 7 is a sectional view taken on line 7—7 of Fig. 6.

In the drawing I have illustrated the flash light 14 provided with a spring clip 16 which may be used for securing the device in the pocket. The flash light is provided with the necessary means for turning the same on and off, and projecting outwardly from the forward end thereof is the light bulb 17. Embracing the body of the flash light 14 is a collar or sleeve 18 provided with knurling 19 for facilitating the slidable movement of the collar on the body of the flash light. As shown in Fig. 5 this collar 18 is split and preferably formed of resilient material so that it will securely grip the body of the flash light and be retained at the positions in which it is moved. It is believed obvious that if desired, a freely slidable sleeve may be moved with a rocking mechanism such as a boss and recess associated with the body and sleeve or collar for securing the structure in various positions of movement. Extending outwardly from the sleeve or collar 19 is an arcuate plate 20 which in reality forms a continuation of the sleeve or collar. An opening 21 formed in this plate 20, and mounted in this opening is a magnifying lens 22.

The construction is such that when the flash light is carried in the pocket the sleeve 18 is slid into the position in Fig. 1, so that the plate 20 lies within the end limits of the flash light body. This structure is preferably made from very thin metal or plastic material so that the size of the body of the flash light is substantially unaltered so that no bulky structure is built up to prevent the easy carrying of the flash light in the pocket. When desired to use the magnifying feature of the invention, the sleeve or collar 18 is slid toward the forward end of the body as shown in Fig. 2, therewith the magnifying lens 22 overlies the area directly in front of the bulb 17; thus it becomes possible to illuminate the material which is visible through the magnifying lens 22 and the advantages sought are thus obtained.

In Fig. 6 I have shown a slightly modified form of construction in which the collar or sleeve 18' is fixedly mounted on the body of the flash light 14' and the plate 20 is dispensed with. Pivotally mounted by means of the pivot pin 23 on the collar 18' is a swingable plate 20' having an opening 21' formed therein in which is mounted the magnifying lens 22'. When it is desired to use the invention the plate 20' is swung into full line position shown in Fig. 6 so that this plate extends beyond the forward end of the flash light retaining the magnifying lens 22' over the area which may be illuminated by the light bulb 17'. When the flash light is not in use the plate 20' may be swung around into the dotted line position shown in Fig. 6 so as to lie within the marginal limits of the body of the flash light 14. In both types of structures it will be noted that the magnifying lens, when in inoperative position, lies within the marginal limits of the flash light 14. The use and operation of the modified form is similar to the form shown in Fig. 1, the method of mounting being slightly altered.

What I claim as new is:

1. In combination with a flash light having a body and a light bulb in one end thereof, a split resilient sleeve embracing and slidably mounted on said body; a curved extension plate projecting forwardly from said sleeve and movable in unison therewith and having an opening formed therein and adapted for lying between the ends of said body and for being projected beyond the light bulb bearing end of said body; and a magnifying lens mounted in said opening and overlying the area in front of said light bulb upon the projection of said plate beyond the end of said body.

2. An attachment for a flash light consisting of a split sleeve adapted to resiliently and slidably embrace the barrel of the flash light, said sleeve having a knurled portion adapted to serve as a finger grip, and a member extending beyond said knurled portion, said extension member having a window therein in which is secured a magnifying lens, said extension member and said lens being curved to closely conform to the contour of the flash light barrel.

ERWIN EICHENBERGER.